United States Patent
Sidenur et al.

(10) Patent No.: US 7,996,774 B1
(45) Date of Patent: Aug. 9, 2011

(54) HIERARCHICAL DISPLAY OF PROJECT INFORMATION IN A COLLABORATION ENVIRONMENT

(75) Inventors: Harish Sidenur, Bangalore (IN); Aniruddha Rao, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 341 days.

(21) Appl. No.: 11/712,844

(22) Filed: Feb. 28, 2007

(51) Int. Cl.
*G06F 3/048* (2006.01)

(52) U.S. Cl. ........ 715/743; 715/745; 715/751; 715/854; 715/965; 715/971

(58) Field of Classification Search .................. 715/741, 715/757, 751, 848, 743, 745, 854, 965, 971
See application file for complete search history.

(56) References Cited

U.S. PATENT DOCUMENTS

| | | | |
|---|---|---|---|
| 5,678,040 A * | 10/1997 | Vasudevan et al. | 707/8 |
| 5,920,867 A * | 7/1999 | Van Huben et al. | 707/101 |
| 6,636,889 B1 * | 10/2003 | Estrada et al. | 709/203 |
| 2002/0147626 A1 * | 10/2002 | Zagotta et al. | 705/9 |

* cited by examiner

*Primary Examiner* — Namitha Pillai
(74) *Attorney, Agent, or Firm* — Van Pelt, Yi & James LLP

(57) ABSTRACT

Providing access to project information in a virtual collaboration environment is disclosed. A credential information associated with a user of the virtual collaboration environment is received. It is determined, based at least in part on the credential information, which portion or portions of a hierarchical set of project information the user is entitled to receive. A hierarchical display that includes the portion or portions of the hierarchical set of project information that it is determined the user is entitled to receive is provided to the user via the virtual collaboration environment.

18 Claims, 6 Drawing Sheets

Access Rights

| | eRoom Environment | eRoom/s | Objects |
|---|---|---|---|
| User Administrator | ✓ | ✓ | ✓ |
| User Executive | | ✓ | ✓ |
| User Team Member | | | ✓ |

Plan details - Microsoft Internet Explorer provided by EMC Corp

Plan details

| Task | Category | Start Date | Due Date | Status |
|---|---|---|---|---|
| SAAPITestRoom1-Project Build WebTop | | | | |
| Create Proposal | Design | 2006-06-07 | 2006-06-08 | ◎ |
| Design | Design | 2006-06-07 | 2006-06-08 | ◎ |
| Gather Requirements | Design | 2006-06-07 | 2006-06-08 | ◎ |
| Review | Code | 2006-06-07 | 2006-06-09 | ◎ |
| SystemTest | Code | 2006-06-07 | 2006-06-09 | ◎ |
| Write test plan | Unit Test | 2006-06-07 | 2006-06-09 | ◎ |
| Develope Modules | Unit Test | 2006-06-07 | 2006-06-08 | ◎ |
| Write Code | Code | 2006-06-09 | 2006-06-13 | ◎ |

Comment

Last Updated: 9/6/2006

FIG. 5

```
Function execXML(targetURL, user, password, strCommand)

set inet = Server.CreateObject("MSXML2.XMLHTTP")
    Dim XMLResponseDOM
    set XMLResponseDOM = Server.CreateObject("MSXML2.DOMDocument")
    XMLResponseDOM.loadXML soapheader + strCommand + soaptrailer
    inet.open "POST", targetURL, False, user, password
    inet.send soapheader + strCommand + soaptrailer
    XMLResponseDOM.loadXML inet.responseText
    execXML = inet.responseText
End Function
```

FIG. 6

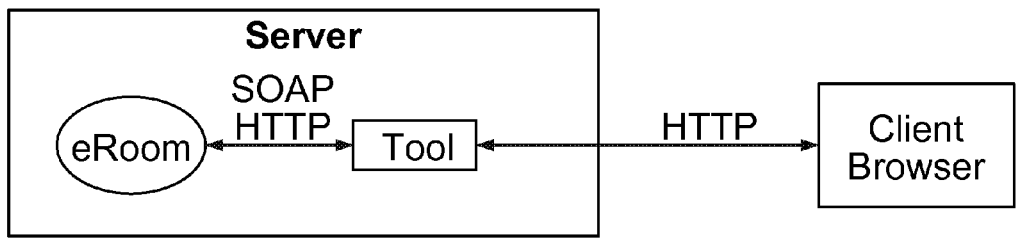

FIG. 7

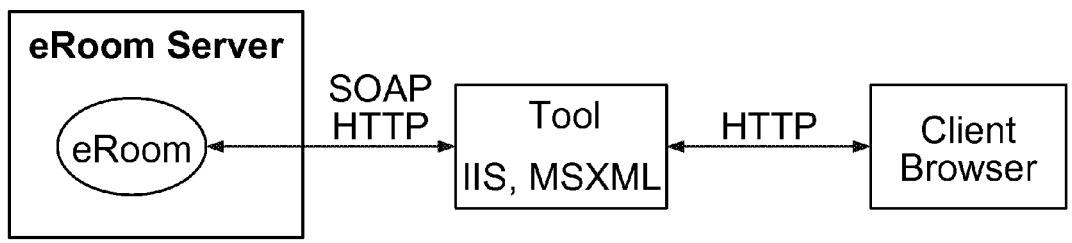

FIG. 8

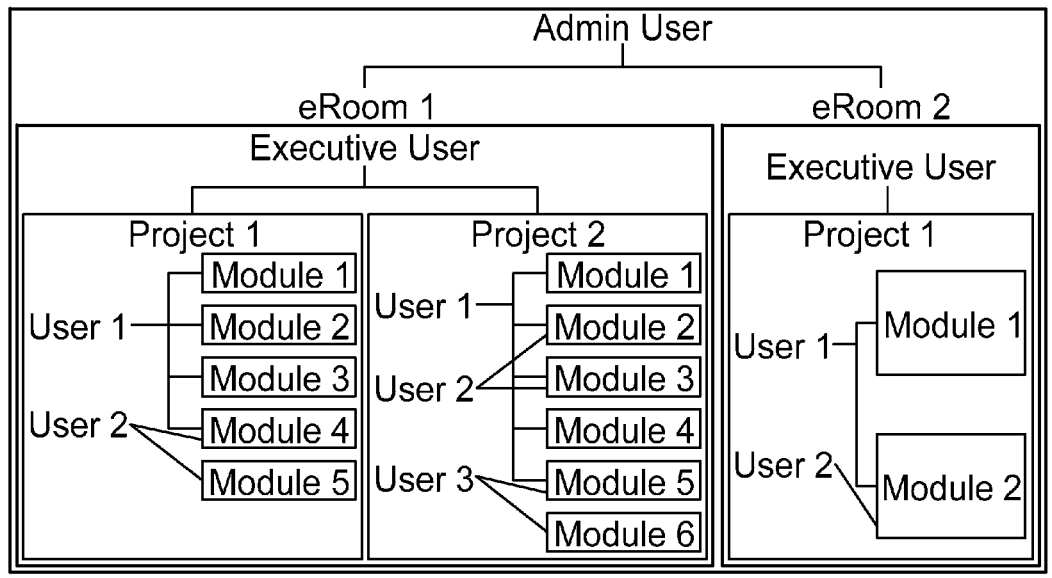
FIG. 9
```
<er:command er:select="/HomePage/Items/Item[Name='planA']">
    <er:getproperties>
    </er:getproperties>
</er:command>
```
FIG. 10
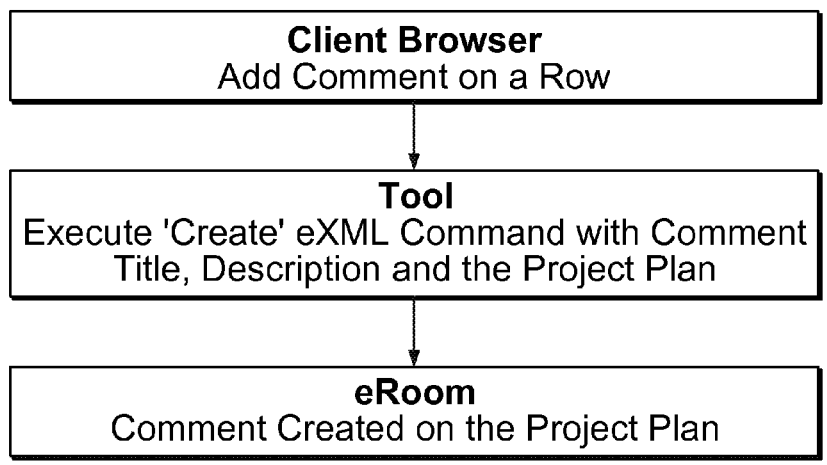
FIG. 11

HIERARCHICAL DISPLAY OF PROJECT INFORMATION IN A COLLABORATION ENVIRONMENT

BACKGROUND OF THE INVENTION

Companies, other enterprises, and other groups of individuals use electronic "virtual" collaboration solutions, such as the EMC Documentum eRoom™ product available from EMC Corporation of Hopkinton, Mass., to manage and complete key projects including client engagements, proposal development, new product development, product lifecycle management, issues management, and business planning. In some cases, such collaboration solutions have been integrated with and/or include content management functionality to create a virtual workspace where all the materials related to a project—all documents, e-mails, task lists, discussions etc. may be stored. Typically, such solutions enable varying degrees of access to project-related content information to be afforded to IT administrators; executives; managers of multiple projects, e.g., related to a product and/or functional area; members of a project team; clients; and partners irrespective of their geographic location.

To work collaboratively on a project, typically it is necessary and/or desirable for team members, managers, clients and partners to always have the latest status on their projects at all times. There is also a need for program managers to have the latest status of all their programs at all times and also for individual project managers to have an updated status of their individual projects as well as the latest inputs or instructions from their program managers about their individual projects. Typically, collaboration solutions did not provide access to such information within the context of the collaboration solution itself.

In some cases, a separate project-planning module that was non-collaborative in nature has been used in conjunction with a collaboration solution, which facilitates keeping track of project status information. Typically, using such an approach project plans for each project are created separately using a project planning software, such as Microsoft Office Project™ available from Microsoft™ Corporation, and storing the project plan, e.g., as a version control document, in the virtual collaborative workspace provided by the collaboration solution. To check project status, a user needed to access this module in addition to any project planning modules included and/or integrated with the collaboration solution. In some cases, a user could create within a collaboration solution a separate module using a database feature with a standard view, but users were still required to go to this module to access project updates.

Therefore, there was a need for a common hierarchical integrated solution to generate project status reports for users.

BRIEF DESCRIPTION OF THE DRAWINGS

Various embodiments of the invention are disclosed in the following detailed description and the accompanying drawings.

FIG. 5 is a diagram of an embodiment of a project level summary view of project information.

FIG. 6 is sample code of a function that generates a SOAP message to retrieve information for an executive level user.

FIG. 7 is a diagram of an embodiment of a system for providing a hierarchical display of project information in a client-server environment.

FIG. 8 is a diagram of an embodiment of a system for providing a hierarchical display of project information in a client-server environment in which the hierarchical display function resides on a different machine with IIS.

FIG. 9 is a diagram displaying an example of a hierarchy assigned to different users of a collaboration solution.

FIG. 10 is a diagram displaying sample source code for obtaining status of a sample object or project plan.

FIG. 11 is a flow diagram illustrating an embodiment of a process for adding a comment with respect to a project.

DETAILED DESCRIPTION

Figure 1:
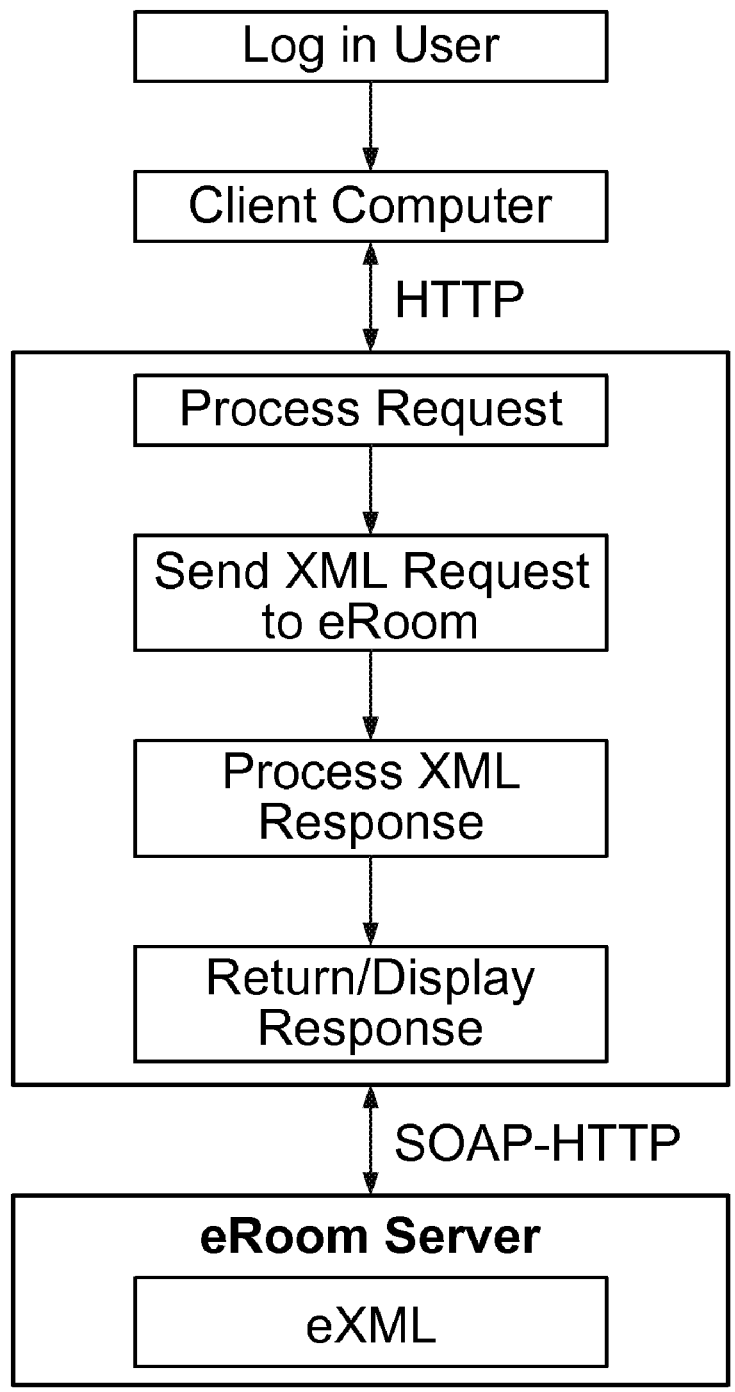
FIG. 1 is a flow diagram of an embodiment of a process for providing a hierarchical display of project information.
Figures 2, 3:
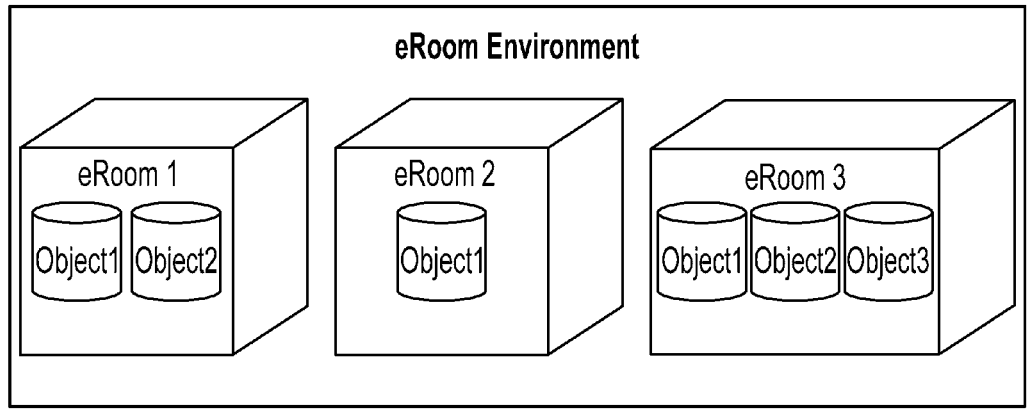
FIG. 2 is a diagram displaying objects and collaborative workspaces ("eRooms" in this example) in a collaboration environment.
FIG. 3 is a table displaying an example of access permissions to users according to a user hierarchy.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing in a collaboration environment a hierarchical display of project information is disclosed. In some embodiments, a HTML page configured to display and receive user provided updates of project information is generated. The page in some embodiments is configured to provide to a user, in a hierarchically organized fashion, access to project information concerning projects with respect to which the user, e.g., by virtue of his/her role, credential, and/or other information, e.g., project information pertaining to projects associated with different virtual workspaces (e.g., eRooms).

In some embodiments, the SOAP is used to provide access to project information, including by providing, as part of a collaboration solution a function installed at a user's client system that translates a valid XML command initiated by the log-in of a user of the collaboration solution; encodes and transmits the XML command to a collaboration solution server along with the log-in information; and processes a response received from the collaboration solution server to the XML command, including by displaying the response and/or updating an HTML page on the client computer according to where the user falls within a hierarchy of users of the collaboration environment.

Definitions of the various terms that are used in the description are given below in order to facilitate better understanding of the invention.

XML—XML or Extensible Markup Language is a W3C-recommended general-purpose markup language for creating special-purpose markup languages, capable of describing many different kinds of data.

Collaboration Solution—a "collaboration solution" may include software and/or hardware components and allows multiple users to collaborate with respect to a project and associated stored objects, e.g., documents, spreadsheets, etc. Some collaboration solutions have been integrated with content management solutions to provide an integrated solution in which stored objects associated with a project are stored by a content management system and exposed and/or accessed via a collaborative workspace, such as an eRoom.

SOAP—SOAP or Simple Object Access protocol is a web service that is formed by the union of XML and HTTP to encode and transmit application data.

IIS—IIS or Internet Information Services are a set of Internet services for Microsoft Windows servers.

MSXML—MSXML are Microsoft XML Core Services are a set of services that allow building of XML applications.

In some embodiments, access to project information and/or content is provided using a web application that employs an XML or other interface of a collaboration solution and/or a content management solution with which the collaboration solution is integrated and/or otherwise associated to obtain and display project information, e.g., in a customized format. In some embodiments, the application uses the data available in or from the collaboration solution and presents it as a hierarchical dashboard at each of a plurality of hierarchical levels, depending on where a particular user fits in the hierarchy and/or with which projects and/or workspaces a user is associated. In some embodiments, the follow hierarchy is defined, e.g., using an administrative interface of the collaboration solution:

1. Administrator level (e.g., IT personnel); and
2. Team (user) levels;
   (a) Executive level: manages one or more projects within each of one or more collaboration workspaces;
   (b) Project team level: assigned as team member on one or more projects, possibly in two or more different workspaces.

FIG. 9 displays a diagram that explains the two levels of hierarchy assigned in the example described above. The Administrator level enables the tracking of overall status of all project modules across different collaborative workspaces. The User Administrator is able to select the project plans to be summarized. The Administrator level enables an Administrator user to—

Select and deselect the project to be tracked for a program available within or across eRooms.
Customize and view the dashboard parameters based on the user hierarchy.
Generate and archive reports based on chosen parameters FIG. 4 displays an embodiment of an Administrator level dashboard display of project information. In the example shown, the projects in eRoom 'SAAPITestRoom1' are Project Mars, Project Build WebTop, Demo, Project Schedule etc. The Administrator user can check the details of each project by clicking on the "Details" button. The Administrator user can also comment on each project by clicking on the "Comment" button adjacent to each project displayed on the Dashboard.

The Team level contains hierarchical dashboards depending on whether the user logging in belongs to Executive level or to the project team level. At the Executive level, summary of each project status in that particular eRoom can be accessed. The Executive User can access and comment on every sub level for all projects in that particular eRoom. The Executive Level enables an Executive User to—

View the Summary of project for a given program.
Comment on the status of each of the project of a program.
View details of the lower level dashboards for hierarchies below Executive level.
View latest and archival reports.

The Project team level allows access and comment options to Project team users to only the projects they have been given access to. Each particular project may be further subdivided into further modules. The Project team users can access and comment on every sub-module in a project but can not access any other project.

Figure 4:
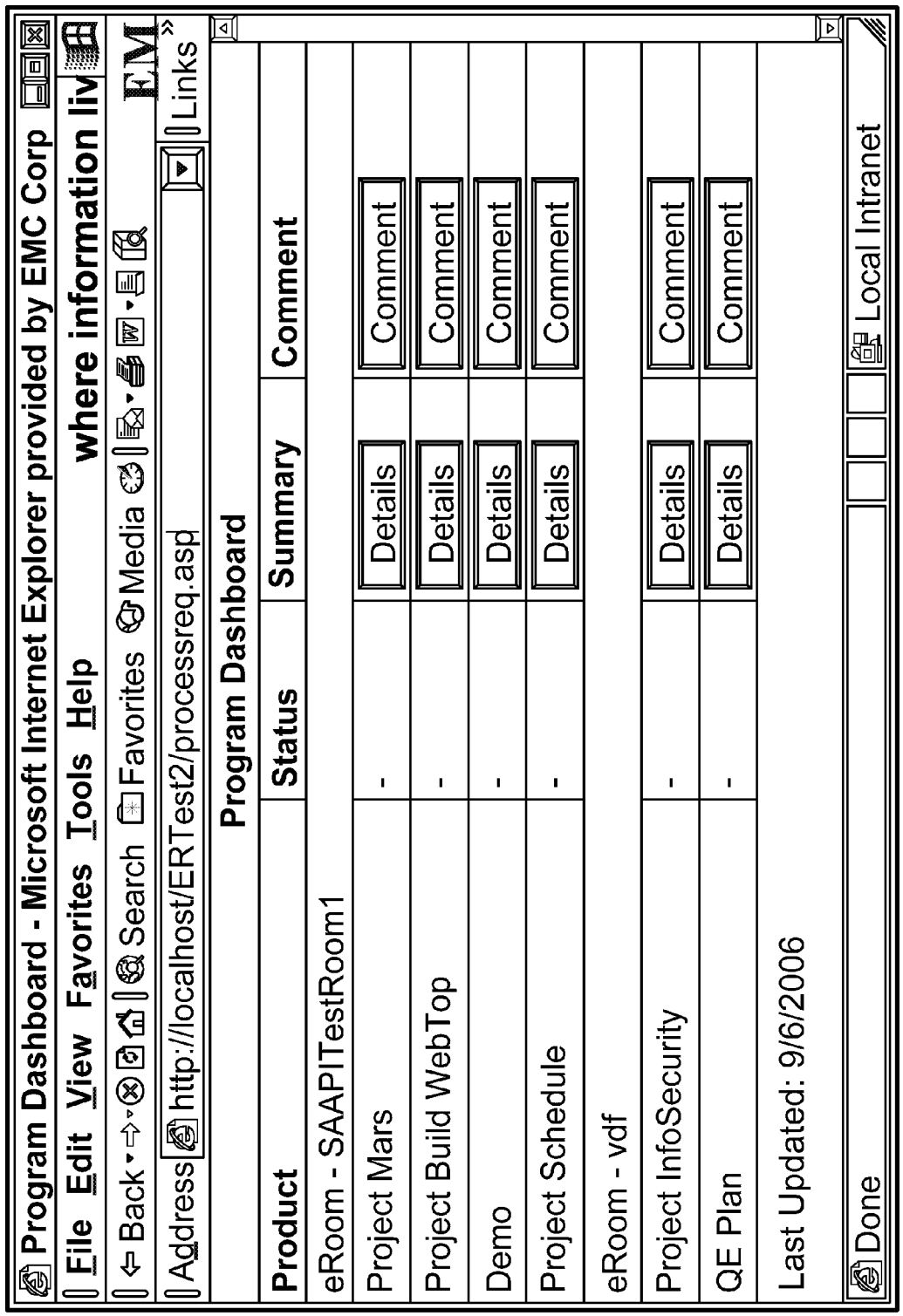
FIG. 4 is a diagram of an embodiment of an executive summary view of project information.

At every level, the comments written by the Project team level users, the Executive users or the Administrator user are stored by the collaboration solution, e.g., in a server connected via a network with a client on which the display of FIG. 4 is provided. The next time the user, at whatever level of hierarchy he may be assigned, can view the earlier comments at his assigned level of hierarchy. The Project team level enables users at this hierarchy to—

View details of the project plan based on hierarchy assigned to him.
Comment on the status of his project.
Read the comment from Executive User for his (Project team user's) project.
View details of the lower level dashboards for any programs that he may have been assigned access to.
View latest and archived reports for his project FIG. 5 displays a sample of the detailed view for a Project User.

Therefore, at any given point of time, a collaboration solution user is provided a status report of the projects he is working/collaborating on depending on his level of hierarchy.

In some embodiments, any comments and/or updates made by either an Administrator user, an Executive User, or a Project team user are stored as comments and/or updates in the respective project plans in a project plan associated with the project by the collaboration solution. FIG. 11 displays a flowchart illustrating an embodiment of a process for creating a comment.

In some embodiments, a user is able to traverse through hierarchical dashboards depending on the hierarchies assigned to the particular user. The user is allowed to traverse only down the hierarchical structure and can not access any module or dashboard of any hierarchy above him.

In some embodiments, an XML interface to access objects in a collaborative workspace from external applications through Simple Object Access protocol (SOAP) requests is provided. In some embodiments, the code for this is independent of the collaboration solution installation and can be installed on the same server as the collaboration solution server or on any machine that runs IIS and has MSXML installed.

In some embodiments, after a user logs in, a function is created that will accept a valid XML or other command associated with the collaboration solution, wrap it in a SOAP envelope, and pass it to the collaboration solution server with the appropriate log-in information. The collaboration server returns a SOAP response, providing the user access to the hierarchical dashboards containing project status and comments.

FIG. 6 is a sample code of an embodiment of a function that on login by an Executive user creates a SOAP envelope as described above and checks whether the user has been assigned proper permissions. If the User does not have proper permissions, he is denied access to the dashboards. If the User is found to have correct permissions, i.e., Executive level permissions in this example, the SOAP response from the collaboration solution server is generated and provides the user access to the Executive level dashboards. In some embodiments, the information retrieved from the collaboration solution server is displayed using style sheets.

In some embodiments, a web application that resides on a web server provides the hierarchical display of project information. In some embodiments, the web application is a Microsoft Windows™ based application and an HS server is used as the application server. The application is accessed by the user, e.g., by giving a HTTP call from the Internet browser of the user's computer. However, access to project information is provided only if user is determined to have the requisite privileges to the collaboration workspace data that he is trying to access.

In some embodiments, comments and/or updates made by a user, whether at the Administrative level, executive level, or at the project team level, are stored in a database on the collaboration solution server. This database is used for storing and retrieving data and does not require any additional installation or set-up. Comments and/or updates are stored in a pre-existing table on the database and are added or retrieved by a user accessing the collaboration solution server according to the user's place in an associated hierarchy.

To interact with the collaboration solution, in some embodiments, users may access a hyperlink or directly enter the URL address of the dashboard in the web browser of their workstation or PC or Laptop and the browser retrieves the HTML file to display the dashboard. The user is provided access according to the hierarchy specified by an Administrative level user. The comments and/or updates made or retrieved by users are sent or retrieved from the database on the collaboration solution server through the HTML page as a wrapper SOAP file, through an XML interface.

Techniques described herein enable project information potentially available in different locations and formats to be consolidated and provided according to a hierarchy of users, if applicable in a hierarchical display, rather than introducing a new data format and/or requiring a module external to a collaboration solution. In addition, users are allowed to comment online in a collaborative, real-time work environment rather than giving static data. Also, the comments are stored and archived and are available to other users to review and take action immediately, thus saving time and effort to locate comments and suggestions given by other users working on the same project.

An embodiment of the invention has been described as retrieving information from the eRoom server using SOAP. Other embodiments of the invention may also be adapted to retrieve information from the eRoom server using classic ASP, Java or Perl. In some embodiments, external applications written in ASP, Java, Perl, or other languages use SOAP as described above to retrieve information from the eRoom server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing access to project planning information in a virtual collaboration environment, comprising:
   receiving a credential information associated with a user of the virtual collaboration environment via a request from a web application, wherein the request comprises a command associated with the virtual collaboration environment wrapped in a web service envelope including the credential information;
   wherein the virtual collaboration environment comprises a given project;
   wherein the given project comprises a stored object associated with project status information stored by a content management system;
   determining, based at least in part on the credential information, a level of a user;
   returning a web service response to provide the user within the virtual collaboration environment access to a hierarchical dashboard, wherein:
   a project level dashboard enables a project level user to:
   1. comment on the status of the given project; and
   2. view other comments associated with the given project;
   an executive level dashboard enables a program manager level user to:
   1. comment on the status of the given project;
   2. comment on the status of a second project, wherein the given project and the second project are both associated with a specific program associated with the program manager;
   3. view other comments associated with the given project or the second project; and
   4. view details of the project level dashboard associated with the given project or a second project level dashboard associated with the second project; and
   an administrator level dashboard enables an administrator level user to:
   1. comment on any project in the virtual collaboration environment;
   2. view other comments associated with any project in the virtual collaboration environment;
   3. select and deselect the given project to be tracked for the specific program; and
   4. customize and view details of the executive level dashboard and project level dashboard; and
   wherein every comment is stored with version control by the content management system.

2. A method as recited in claim 1, wherein the hierarchical display comprises a web page.

3. A method as recited in claim 1, wherein the credential information comprises a collaboration environment credential associated with the virtual collaboration environment.

4. A method as recited in claim 1, wherein the virtual collaboration environment comprises an eRoom™ environment.

5. A method as recited in claim 1, wherein the virtual collaboration environment comprises one or more virtual collaboration workspaces.

6. A method as recited in claim 5, wherein each virtual collaboration workspace comprises an eRoom™.

7. A method as recited in claim 5, wherein each virtual collaboration workspace has associated with it one or more projects.

8. A method as recited in claim 1, wherein said executive level display includes for each virtual collaboration workspace in the set a corresponding project planning information for each project associated with that virtual collaboration workspace.

9. A method as recited in claim 1, wherein the non-executive level display is organized by virtual collaboration workspace, such that project planning information associated with a particular project appears in a region associated with the particular virtual collaboration workspace with which that particular project is associated.

10. A method as recited in claim 1, wherein the project planning information includes one or more of the following: user comments; instructions from higher level users; project schedule information; project status information; and project task status information.

11. A method as recited in claim 1, wherein said virtual collaboration environment includes one or more virtual collaboration workspaces each of which has associated with it one or more stored objects accessible to members of the virtual collaboration workspace; and at least a portion of said project planning information is stored with said stored objects.

12. A method as recited in claim 11, wherein said stored objects and said at least a portion of said project planning information are stored in a managed content repository.

13. A method as recited in claim 12, wherein said virtual collaboration environment is provided by a virtual collaboration solution that is integrated with said managed content repository.

14. A method as recited in claim 1, further comprising updating the project planning information based on input received from the user.

15. A method as recited in claim 1, wherein the user is entitled to update project planning information associated with the portion or portions of the hierarchical set of project planning information that it is determined the user is entitled to receive.

16. A system configured to provide a virtual collaboration environment, comprising:
 a content management system;
 a communication interface configured to receive a credential information associated with a user of the virtual collaboration environment via a request from a web application, wherein the request comprises a command associated with the virtual collaboration environment wrapped in a web service envelope including the credential information;
 wherein the virtual collaboration environment comprises a given project;
 wherein the given project comprises a stored object associated with project status information stored by a content management system; and
 a hardware processor coupled to the communication interface and configured to determine, based at least in part on the credential information, a level of a user;
 returning a web service response to provide the user within the virtual collaboration environment access to a hierarchical dashboard, wherein:
  a project level dashboard enables a project level user to:
   1. comment on the status of the given project; and
   2. view other comments associated with the given project;
  an executive level dashboard enables a program manager level user to:
   1. comment on the status of the given project;
   2. comment on the status of a second project, wherein the given project and the second project are both associated with a specific program associated with the program manager;
   3. view other comments associated with the given project or the second project; and
   4. view details of the project level dashboard associated with the given project or a second project level dashboard associated with the second project; and
  an administrator level dashboard enables an administrator level user to:
   1. comment on any project in the virtual collaboration environment;
   2. view other comments associated with any project in the virtual collaboration environment;
   3. select and deselect the given project to be tracked for the specific program; and
   4. customize and view details of the executive level dashboard and project level dashboard; and
 wherein every comment is stored in the content management system.

17. A system as recited in claim 16, wherein the communication interface comprises a network interface and the credential information is received via a network.

18. A computer program product for providing access to project planning information in a virtual collaboration environment, the computer program product being embodied in a computer readable storage medium and comprising computer instructions for:
 receiving a credential information associated with a user of the virtual collaboration environment via a request from a web application, wherein the request comprises a command associated with the virtual collaboration environment wrapped in a web service envelope including the credential information;
 wherein the virtual collaboration environment comprises a given project;
 wherein the given project comprises a stored object associated with project status information stored by a content management system;
 determining, based at least in part on the credential information, a level of a user;
 returning a web service response to provide the user within the virtual collaboration environment access to a hierarchical dashboard, wherein:
  a project level dashboard enables a project level user to:
   1. comment on the status of the given project; and
   2. view other comments associated with the given project;
  an executive level dashboard enables a program manager level user to:
   1. comment on the status of the given project;
   2. comment on the status of a second project, wherein the given project and the second project are both associated with a specific program associated with the program manager;
   3. view other comments associated with the given project or the second project; and
   4. view details of the project level dashboard associated with the given project or a second project level dashboard associated with the second project; and
  an administrator level dashboard enables an administrator level user to:
   1. comment on any project in the virtual collaboration environment;

2. view other comments associated with any project in the virtual collaboration environment;
3. select and deselect the given project to be tracked for the specific program; and
4. customize and view details of the executive level dashboard and project level dashboard; and wherein every comment is stored in the content management system.

* * * * *